Nov. 29, 1927.　　　　　　　　　　　　　　　　　　　　1,651,068
O. J. NITARDY
SCARIFIER
Filed Oct. 23, 1926
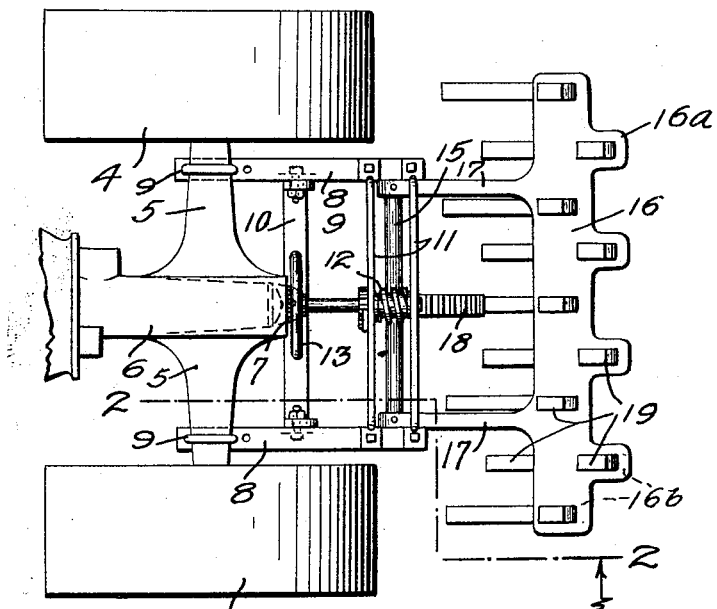
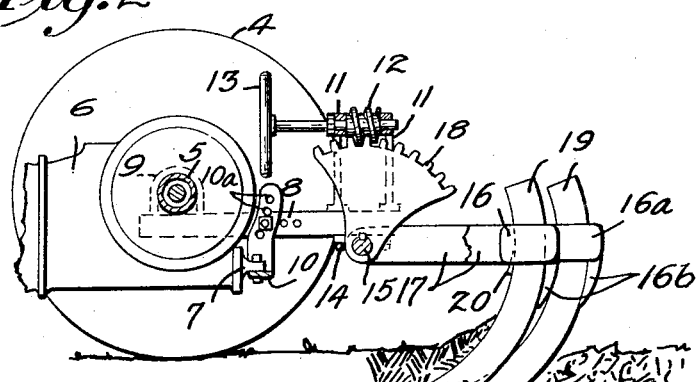
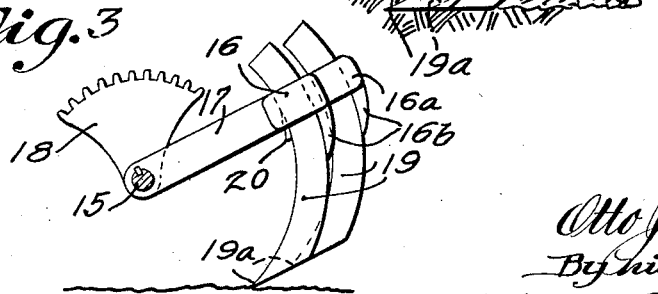
Inventor
Otto J. Nitardy
By his Attorneys
Williamson Rieth Williamson Patented Nov. 29, 1927.

1,651,068

UNITED STATES PATENT OFFICE.

OTTO J. NITARDY, OF MINNEAPOLIS, MINNESOTA.

SCARIFIER.

Application filed October 23, 1926. Serial No. 143,609.

This invention relates to a scarifier adapted to be dragged by a tractor, road grader, or other vehicle.

The principal objections to scarifiers in general use at this time are, first that the teeth become dull in a comparatively short time, and secondly that due to the construction of the frame and teeth, the teeth will not be easily projected into the ground, but will tend to bounce for some time on the road, especially if the surface is hard.

The main object of my invention is to provide a simple but highly efficient scarifier, overcoming the disadvantages above enumerated, and constructed in such a manner that the teeth will be automatically sharpened as the device is being utilized.

A further object is to provide a scarifier having a supporting frame and teeth mounted therein, so constructed and so related that the points of the teeth will be quickly forced into the ground when the device is dragged in operative position.

A still further object is to provide a scarifier wherein the angle of the inclination of the teeth to the ground is maintained constant regardless of the depth at which said teeth work.

These and other objects of the invention will be apparent from the following description made in connection with the accompanying drawings, wherein like characters refer to similar parts throughout the several views, and in which:

Fig. 1 is a plan view of the rear end of a Fordson tractor with a preferred embodiment of my device attached thereto;

Fig. 2 is a vertical section taken on the line 2—2 of Fig. 1, showing the teeth in operative position; and Fig. 3 is a vertical section through the scarifier, showing the teeth in position to be projected into the ground.

Referring to the drawings in detail, the rear end of a Fordson tractor is illustrated, including the rear wheels 4, the axle housing 5, the transmission and differential housing 6, and the draw bar cap 7, secured to the lower rear portion of the transmission and differential housing.

My device may be attached to a draft vehicle in any suitable manner. In the drawings I provide a substantially rigid frame comprising a pair of side bars 8, secured at their forward ends to the axle housing 5 by U-bolts 9, and having the transverse U-shaped beam 10 secured thereacross. The vertical ends of beam 10 are provided with a plurality of apertures 10ª arranged in the arc of a circle through which bolts pass to secure arms 8 rigidly. Beam 10 is bolted or pinned at its central portion to the draw bar cap 7. A pair of spaced transverse bars 11 are secured across the rear ends of frame members 8 supporting the centrally disposed worm 12 having the operating wheel 13 secured to the inner end thereof.

A pair of oppositely alined bearings 14 are carried on the under side of frame bars 8, in which the rock shaft 15 of my scarifier proper is journaled.

The scarifier frame comprises a relatively wide beam or bar 16 having therein a plurality of arcuate slots arranged in staggered position, as shown in Fig. 1. The rear side of bar 16 has a plurality of lateral projections 16ª through which the slots for the rear line of teeth are made. Bar 16 is preferably rigidly connected to rock shaft 15 by means of a pair of heavy arms 17, which may be formed integrally therewith, or secured as desired. The beam thus swings on the axis of shaft 15 and may be held and swung to various positions by means of worm 12 engaging the gear segment 18 rigidly secured to rock shaft 15.

My scarifier teeth 19 are constructed from arcuate bars or plates, and when mounted in operative position extend in the circumference of circles approximately concentric with the axis of rock shaft 15. The teeth 19 may be rigidly secured to bar 16 by any suitable means, such as the wedges 20. The bottom edges of teeth 19 are formed in straight lines extending horizontally and substantially parallel to the surface of the road when in operative position, and forming the sharp forwardly disposed cutting points 19ª.

Beam 16 is provided with a plurality of depending reinforcements 16ᵇ, each disposed immediately rearward of one of the arcuate slots adapted to receive teeth 19. Reinforcements 16ᵇ are contacted by the rear side of the teeth and add considerably to the durability and efficiency of the device. Beam 16 can be constructed from relatively thin material since the thickened reinforcing portions afford the supports necessary for the dragging of the teeth through the ground.

In operation, bar 16 may be readily swung upwardly or downwardly on the rock shaft 15 by means of the worm 12. It will be seen that the longitudinal center lines of teeth 19 not only extend in circles concentric with the axis of rock shaft 15, but that due to the construction of the scarifier frame the teeth are swung in the path of circles concentric with the pivot. Thus, when the teeth are swung downwardly the sharp points 19ª will be immediately forced and dragged into the ground, due to the straight force exerted by the draft vehicle and the construction previously referred to. The shape of teeth 19 and their disposition relatively to the rock shaft 15 keeps the angle of their inclination to the ground constant regardless at what depth they work. When in operative position, as shown in Fig. 2, the straight bottom edges of the teeth extend substantially horizontally, and it will be seen that the wear on the teeth will take place uniformly along the bottom edges, thus always maintaining the sharp cutting points 19ª.

From the foregoing description, it will be seen that I have invented a simple, but highly improved scarifier, the combination between the swinging frame and my arcuate teeth concentrically disposed relatively to the pivot of the frame being responsible for new and improved results.

It will, of course, be understood that various changes may be made in the form, details, proportions and arrangement of parts without departing from the scope of the invention.

What is claimed is:

1. A scarifier having in combination a beam connected for swinging movement to a horizontal pivot, a plurality of arcuate scarifying teeth carried by said beam, said teeth being disposed with their longitudinal center lines concentric with said pivot and having straight lower edges disposed at sharp angles to said center lines.

2. A scarifier having in combination a beam adapted to be transversely disposed relatively to a draft vehicle, a relatively short arm rigidly carried by said beam pivoted for substantially vertical swinging movement, and a plurality of arcuate scarifying teeth rigidly carried by said beam constructed and disposed in such manner that their longitudinal center lines extend in the circumference of circles concentric with said pivot, said teeth having straight lower edges extending at sharp angles to the longitudinal center lines thereof and adapted to lie substantially parallel with the surface of the ground or road when being dragged through the same.

3. A scarifier having in combination a beam adapted to be disposed transversely of a draft vehicle, means for swinging said beam on substantially a horizontal axis, said beam having therethrough a plurality of substantially arcuate slots, depending reinforcing means adjacent the rear of each of said slots, and a plurality of arcuate scarifying teeth carried by said beam and extending through said slots, said teeth and said slots being so constructed that said teeth extend in circles concentric with the axis on which said beam swings.

In testimony whereof I affix my signature.

OTTO J. NITARDY.